United States Patent
Argoety et al.

(10) Patent No.: US 12,132,747 B2
(45) Date of Patent: Oct. 29, 2024

(54) USER IMPACT POTENTIAL FOR SECURITY ALERT MANAGEMENT

(71) Applicant: Microsoft Technology Licensing, LLC, Redmond, WA (US)

(72) Inventors: Itay Argoety, Petach Tikva (IL); Jonathan Moshe Monsonego, Tel-Aviv (IL); Idan Hen, Tel-Aviv (IL); Payal Rani, Redmond, WA (US); Sridhar Periyasamy, Burnaby (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 16/660,359

(22) Filed: Oct. 22, 2019

(65) Prior Publication Data

US 2021/0120014 A1  Apr. 22, 2021

(51) Int. Cl.
| | |
|---|---|
| H04L 9/40 | (2022.01) |
| G06F 21/55 | (2013.01) |
| G06F 21/57 | (2013.01) |
| H04L 41/0604 | (2022.01) |

(52) U.S. Cl.
CPC ........ *H04L 63/1416* (2013.01); *G06F 21/552* (2013.01); *G06F 21/554* (2013.01); *G06F 21/577* (2013.01); *H04L 41/0609* (2013.01); *H04L 63/102* (2013.01); *H04L 63/1425* (2013.01); *H04L 63/1433* (2013.01); *H04L 63/1441* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 9,338,181 B1 | 5/2016 | Burns et al. | |
| 9,401,925 B1* | 7/2016 | Guo | G06F 21/552 |
| 9,537,880 B1* | 1/2017 | Jones | H04L 63/1433 |
| 2018/0114016 A1* | 4/2018 | Lee | G06F 21/552 |
| 2018/0288063 A1* | 10/2018 | Koottayi | G06F 21/50 |

(Continued)

OTHER PUBLICATIONS

Manikopoulos, C. and Papavassiliou, S., 2002. Network intrusion and fault detection: a statistical anomaly approach. IEEE Communications Magazine, 40(10), pp. 76-82. (Year: 2002).*

(Continued)

*Primary Examiner* — Luu T Pham
*Assistant Examiner* — Edward X Long
(74) *Attorney, Agent, or Firm* — Wade IP Law PLLC (57) ABSTRACT

Techniques for user impact potential based security alert management in computer systems are disclosed. One example technique includes receiving an alert indicating that a security rule has been violated by a user. The example technique can also include, in response to receiving the data representing the alert, determining an impact score of the user based on the profile of the user. The impact score represents a deviation of an assigned value to the profile of the user and a mean value of assigned values of profiles of all users in the organization. The example technique can further include calculating a ranking value of the alert in relation to other alerts based on the determine impact score and other impacts scores corresponding to the other alerts and selectively surfacing the alert to a system analyst based on the calculated ranking value in relation to other alerts.

20 Claims, 5 Drawing Sheets

(56) References Cited

U.S. PATENT DOCUMENTS

2018/0336353 A1    11/2018  Manadhata et al.
2019/0098037 A1     3/2019  Shenoy et al.
2020/0351285 A1*   11/2020  Eisenkot ............... G06F 21/316

OTHER PUBLICATIONS

Kruegel, C. and Vigna, G., 2003, October. Anomaly detection of web-based attacks. In Proceedings of the 10th ACM conference on Computer and communications security (pp. 251-261). (Year: 2003).*
"International Search Report and Written Opinion Issued in PCT Application No. PCT/US20/052990", Mailed Date: Nov. 19, 2020, 10 Pages.
Communication under Rule 71(3) Received for European Application No. 20792802.9, mailed on Apr. 16, 2024, 09 pages.
Decision to grant a European patent pursuant to Article 97(1) Received for European Application No. 20792802.9, mailed on Aug. 29, 2024, 02 pages.

* cited by examiner

USER IMPACT POTENTIAL FOR SECURITY ALERT MANAGEMENT

BACKGROUND

Computer security involves protecting hardware, software, electronic data, and other components of computing systems from unauthorized access, alteration, or theft. Example security threats to computer systems include computer viruses, computer worms, phishing messages, botnets, rootkits, and keyloggers. To guard against such security threats, computer systems can implement various security controls that are configured to provide confidentiality, integrity, and availability of components in the computer systems. For example, a firewall can be deployed between an external network and a local area network to monitor and direct incoming and outgoing network traffic. In another example, access control can be implemented to specify which users can have access to what data as well as what operations that the users are allowed to perform on the data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To guard against security threats, various security controls can be deployed to monitor operations and operational parameters in computer systems and generate notifications or alerts based on security rules. For example, when a user requests access to data that the user is not granted access to, an access control can generate an alert indicating an unauthorized access request. In another example, a firewall may detect a large number of incoming network requests that exceeds a set threshold. In response, the firewall can generate another alert indicating, for instance, a potential distributed denial of service attack to a local area network protected by the firewall.

Typically, a team of security analysts can review various alerts generated by security controls and determine whether an alert is a false positive, or remedial actions may be needed in response to the alert. However, in large-scale computer systems, numbers of alerts generated by security controls over a short period can be voluminous. Reviewing such large numbers of alerts for false positives or remedial actions can be labor intensive, costly, and prone to "alert fatigue." Thus, the alerts are normally sorted, ranked, or classified according to some criteria for urgency of review by security analysts. In one example, an importance score may be calculated for each alert based on how much the detected operation deviates from a baseline value. For instance, if a number of detected network requests by the firewall only exceeds the preset threshold by a small amount, the importance score for the generated alert may be low. In another example, an importance score may also be calculated based on a number of similar alerts previously generated for a user. For instance, if the access control has detected that the user has repeatedly attempted unauthorized access to data, the importance score for the unauthorized access alert may be high.

The foregoing importance scoring may help to classify large numbers of alerts based on deviation from baseline values of operational parameters in computer systems. However, importance scoring does not consider impact potential that a compromised user may cause a computer system and/or an organization associated with the computer system. For instance, in the unauthorized access example above, if a large number of alerts were generated corresponding to a first user, the first user may have a higher importance score than a second user corresponding to a single generated alert. However, the second user may have a higher data access privilege, higher organizational position, or authorization to access high value assets than the first user. As such, if the second user were compromised, damage caused by the second user to the computer system or the organization can be much higher than the first user.

Several embodiments of the disclosed technology can address certain aspects of the foregoing drawbacks by implementing an alert management system that is configured to derive impact scores corresponding to individual alerts associated with the users based on user profiles. The impact scores represent levels of potential damage the users can cause the computer system and/or the organization in relation to other users in the organization. Various types of user data may be used to derive an impact score. For example, an impact score can be generated based on one or more of the following:

- types of data a user handles or has access to (e.g., confidential or public data);
- organization position of the user (e.g., software engineer, engineering manager, vice president, or chief executive officer);
- membership of the user to one or more groups (e.g., executive committee, board of directors, or engineering management);
- network privileges of the user to on-premise, cloud, or other suitable types of networks (e.g., access to private cloud of an organization);
- privileges to secured database servers or other suitable types of servers; or
- access privileges to high value assets (e.g., design documents of new hardware/software products, source codes, or financial documents).

In other examples, an impact score can also be derived based on a number of other users reporting to the user, a security clearance of the user, and/or other suitable types of user data, manually tagged as sensitive by the security analyst.

In certain implementations, machine learning may be applied to perform an unsupervised statistical analysis of the user data of the users. In one example, values of the user data may be pre-processed to have corresponding numerical values prior to performing the statistical analysis. For instance, a position of "software engineer" can be assigned a position value of ten while a position of "chief executive officer" is assigned a position value of one hundred. A first network privilege can be assigned a privilege value of one while a second network privilege higher than the first network privilege can be assigned a privilege value of ten, fifty, or one hundred. As such, various types of user data can be converted into corresponding sets of numerical values for statistical analysis. In certain implementations, a security analyst can assign the various numerical values to the user data. In other implementations, the assigned numerical values may be from machine learning or other suitable sources.

For a certain type of the user data, the alert management system can be configured to perform a statistical analysis to determine a statistical distribution of such user data. For instance, position values of multiple users in an organization can be summed and averaged to derive a position mean in the organization. In other examples, position values can also be used to derive a medium, a standard deviation, or other suitable statistical parameters.

Subsequently, the alert management system can be configured to calculate or assign an impact score for each of the users based on a deviation of the corresponding value of the user data to the derived mean (or other suitable statistical parameters) in the organization. In certain implementations, the deviation can be a linear difference. For example, if the position mean in the organization is eleven and a first user has a position value of ten (e.g., corresponding to a "software engineer"), the first user can be assigned an importance score of one. If a second user has a position value of one hundred (e.g., corresponding to a "chief executive officer"), the second user can be assigned an importance score of eighty-nine. In other implementations, the deviation can be a non-linear difference between values of the user data and the derived mean. Example non-linear functions suitable for calculating the impact scores include logarithmic, exponential, and other suitable non-linear functions.

The various calculated or assigned impact scores for the individual types of the user data can then be summed to derive an overall impact score for a user. In certain embodiments, the impact score and/or the overall impact score can be normalized, for instance, based on a scale of zero to one hundred. In other embodiments, the impact scores from corresponding types of user data may be weighted differently in the overall impact score, for instance, by assigning different weight factors to each type of the user data. In yet further embodiments, a security analyst or other suitable entities can manually modify the derived impact scores and/or overall impact scores of the users based on security system knowledge or other suitable information.

During operation, upon detecting an incoming alert, the alert management system can be configured to determine a user associated with the incoming alert. For example, the alert management system may determine that the incoming alert is alert associated with a user in the organization for unauthorized access. The alert management system can then be configured to calculate or otherwise determine an impact score associated with the user. In certain embodiments, determination of the impact score can include retrieving an impact record containing the impact score previously calculated for the user. For example, the alert management system can be configured to calculate and recalculate impact scores of users daily, weekly, monthly, or based on other suitable time intervals using current values of the user data. In another embodiment, the alert management system can be configured to calculate the impact score of the user on an ad hoc basis, i.e., in response to receiving the incoming alert. In further embodiments, the alert management system can be configured to determine the impact score in other suitable manners.

In certain embodiments, the alert management system can be configured to rank the incoming alert in relation to other alerts based on the impact scores or bias the importance scores using the impact score. For example, alerts with higher impact scores can be ranked higher than other alerts with lower impact scores. In another example, importance scores can be modified, e.g., using the impact scores as multipliers, additions, or in other suitable manners. As such, alerts associated with high impact scores can also have high modified importance scores.

In other embodiments, the alert management system can also be configured to automatically perform one or more security operations based on the impact scores. For example, when a determined impact score exceeds a preset impact threshold, the alert management system can be configured to perform one or more of the following:

temporarily suspending access of the user;
    requesting addition security credentials (e.g., two-factor authentication) from the user;
    revoking security token of the user;
    sending an email to the user's manager or supervisor for confirmation or other suitable types of information;
    disabling an account of the user to the computer system.

In other examples, the alert management system can also be configured to place a lock on data items, block incoming/outgoing network traffic, or perform other suitable computing operations.

Several embodiments of the disclosed technology can thus efficiently address alerts from various security controls based on impact potential to the computer system and/or the organization by a corresponding user. By determining impact scores based on user data for incoming alerts, the alert management system can prioritize and surface alerts with high impact potentials to security analysts, thereby allowing the security analysts to efficiently process the incoming alerts. The alert management system can also be configured to perform automated security actions in response to incoming alerts. As such, potential impact to the computer system and/or the organization caused by a compromised user associated with the incoming alert can be reduced, thereby improving computer security in computer systems.

DETAILED DESCRIPTION

Certain embodiments of systems, devices, components, modules, routines, and processes for impact potential based security alert management are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-5.

As used herein, the term "computing cluster" generally refers to a computing system having a plurality of network devices that interconnect multiple servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric," which forms at least a part of a distributed computing system. The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. In one example, a node can include a computing server having a hypervisor configured to support one or more virtual machines.

Further used herein, the term "computing service" generally refers to one or more computing resources provided over a computer network, such as the Internet. Common examples of computing services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, a "security control" generally refers to computer hardware and/or software components that are configured to provide confidentiality, integrity, and availability of components in computer systems. For example, a firewall can be deployed between an external network and a local area network to monitor and direct incoming and outgoing network traffic. In another example, access control can be implemented to specify which users can have access to what data as well as what operations that the users are allowed to perform on the data. Various security controls can also be configured to generate security alerts during operation when, for instance, a user violates a security rule.

As used herein, a "security alert" or "alert" generally refers to a data package containing information indicating that a security rule has been violated. For example, when a user requests access to data that the user is not granted access to, an access control can generate an alert indicating the unauthorized access request. In another example, a firewall may detect a large number of incoming network requests that exceeds a set threshold. In response, the firewall can generate another alert indicating, for instance, a potential distributed denial of service attack to a local area network protected by the firewall. Alerts can also contain information regarding identity of the user who violated the security rule, identity of the security rule, a date/time when the security rule is violated, and/or other suitable information.

As used herein, the phrase "machine learning" generally refers to a data analysis technique that computer systems use to perform a specific task without using explicit instructions and relying instead on patterns and inference, One example machine learning technique uses a "neural network" or "artificial neural network" that is configured to "learn," or progressively improve performance on tasks by studying examples, generally without task-specific programming. For example, in image recognition, a neural network may learn to identify images that contain cats by analyzing example images that have been manually labeled as "cat" or "no cat" and using the results to identify cats in new images.

In certain implementations, a neural network can include multiple layers of objects generally refers to as "neurons" or "artificial neurons." Each neuron can be configured to perform a function such as a non-linear activation function based on one or more inputs via corresponding connections. Artificial neurons and connections typically have a weight that adjusts as learning proceeds. The weight increases or decreases a strength of an input at a connection. Typically, artificial neurons are organized in layers. Different layers may perform different kinds of transformations on respective inputs. Signals typically travel from an input layer, to an output layer, possibly after traversing one or more intermediate layers.

In addition, as used herein, an "impact score" is a value that represents a level of potential damage a user can cause a computer system and/or an organization associated with the computer system. An impact score can be derived from various types of user data included in a profile of a user. For example, an impact score can be a deviation of an assigned value to the profile of the user and a mean value of assigned values of profiles of all users in the organization. Other example processes for deriving an impact score are described below with reference to FIG. 3.

To guard against security threats, various security controls can be deployed in computer systems to monitor operations and operational parameters and generate alerts based on predetermined security rules. Typically, a team of security analysts can review various alerts generated by security controls and determine whether an alert is a false positive, or remedial actions may be needed in response to the alert. However, in large-scale computer systems, numbers of alerts generated by security controls over a short period can be voluminous. Reviewing such large numbers of alerts for false positives or remedial actions can be labor intensive, costly, and prone to "alert fatigue."

In certain computer systems, alerts can be sorted, ranked, or classified according to an importance score that is calculated based on how much the detected operation deviates from a baseline value. Such importance scoring may help to classify large numbers of alerts based on deviation from baseline values of operational parameters in computer systems. However, importance scoring does not consider impact potential that a compromised user may cause a computer system and/or an organization associated with the computer system.

Several embodiments of the disclosed technology can address certain aspects of the foregoing drawbacks by implementing an alert management system that is impact scores of users corresponding to incoming alerts. Upon detecting an incoming alert, the alert management system can be configured to determine a user associated with the incoming alert. The alert management system can then be configured to calculate or otherwise determine an impact score associated with the user. The alert management system can be configured to rank the incoming alert in relation to other alerts based on the impact scores or bias the importance scores using the impact score. The alert management system can also be configured to automatically perform one or more security operations based on the impact scores. As such, potential impact to the computer system and/or the organization caused by a compromised user associated with the incoming alert can be reduced, as described in more detail below with reference to FIGS. 1-5.

Figure 1:
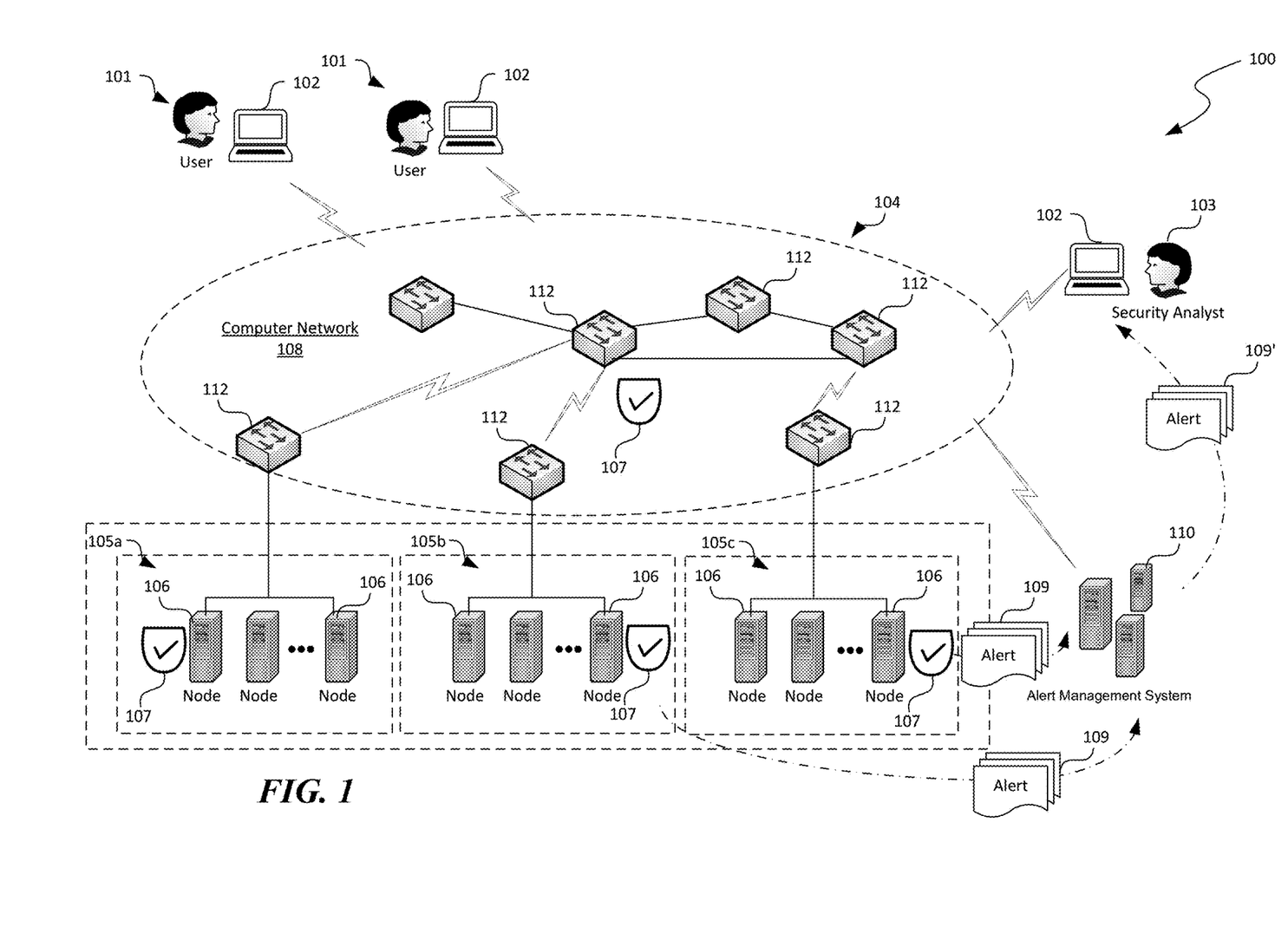
FIG. 1 is a schematic diagram illustrating a computer system having an alert management system implementing impact potential based security alert management in accordance with embodiments of the disclosed technology.

FIG. 1 is a schematic diagram illustrating a computer system 100 having an alert management system implementing impact potential based security alert management in accordance with embodiments of the disclosed technology.

As shown in FIG. 1, the computer system 100 can include a computer network 108 interconnecting users 101 and a security analyst 103 via client devices 102, nodes 106 in a computing fabric 104, and an alert management system 110. Even though particular components of the computer system 100 are shown in FIG. 1, in other embodiments, the computer system 100 can also include additional and/or different constituents. For example, the computer system 100 can include additional computing fabrics, network storage devices, utility infrastructures, and/or other suitable components.

The client devices 102 can each include a computing device that facilitates corresponding users 101 to access computing services provided by the computing fabric 104 via the computer network 108. For example, in the illustrated embodiment, the client devices 102 individually include a desktop computer. In other embodiments, the client devices 102 can also include laptop computers, tablet computers, smartphones, or other suitable computing devices. Even though two users 101 and corresponding client devices 102 are shown in FIG. 1 for illustration purposes, in other embodiments, the computer system 100 can facilitate any suitable number of users 101 to access computing services provided by the computing fabric 104.

As shown in FIG. 1, the computer network 108 can include one or more network devices 112 that interconnect the users 101 and components of the computing fabric 104. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies. In one embodiment, the computer network 108 includes the Internet. In other embodiments, the computer network 108 can also include a local area network, a wide area network, a virtual private network, or other suitable types of computer network.

In certain embodiments, the nodes 106 can individually include a processor, a physical server, or a blade containing several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three computing clusters 105 (shown individually as first, second, and third computing clusters 105a-105c, respectively), which are operatively coupled to corresponding network devices 112 in the computer network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

As shown in FIG. 1, the computer system 100 can also deploy one or more security controls 107. In certain embodiments, the security controls 107 can include hardware and/or software components deployed on the nodes 106 and/or the network device 112. In one example, a security control can be deployed on a node 106 as a computing service (e.g., an access control service). In another example, a security control can be deployed in the computer network 108 as a standalone firewall. In further examples, a security control can be deployed on multiple nodes 106 and/or network devices 112 for network filtering, virus scanning, and/or other suitable operations. During operation, the various security controls 107 can be configured to generate alerts 109 when a security rule is violated. The generated alerts 109 can be transmitted to the alert management system 110 for further processing via the computer network 108.

The alert management system 110 can be configured to implement impact potential based alert management when processing the incoming alerts 109. In certain embodiments, the alert management system 110 can include an impact engine 120 (shown in FIG. 2A) that is configured to determine an impact score of a user associated with an incoming alert. The determined impact score can then be used to sort, rank, or modify priority of the incoming alerts 109. The impact score can also be used to trigger automatic security actions based on present impact thresholds. Using such a technique, sorted alerts 109' with high impact scores may be selectively surfaced to security analyst 103 for efficient processing. Example components of the impact engine 120 are described in more detail below with reference to FIG. 2.

Figure 2:
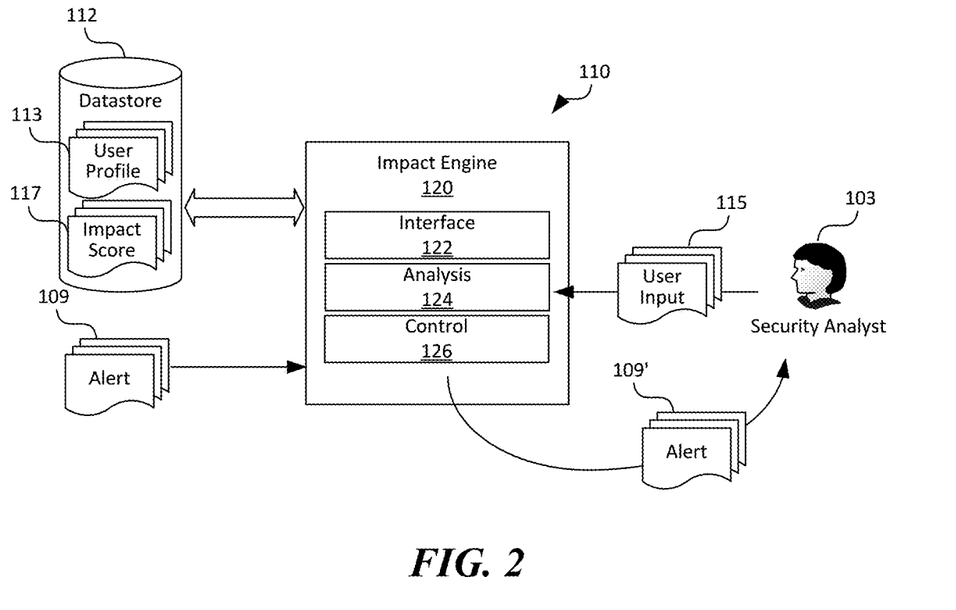
FIG. 2 is a schematic diagram illustrating certain hardware/software components of an impact engine suitable for the alert management system in FIG. 1 in accordance with embodiments of the disclosed technology.

FIG. 2 is a schematic diagram illustrating certain hardware/software components of an impact engine 120 suitable for the alert management system 110 in FIG. 1 in accordance with embodiments of the disclosed technology. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the impact engine 120 can include an interface component 122, an analysis component 124, and a control component 126 operatively coupled to one another. Though particular components are shown in FIG. 2, in other embodiments, the impact engine 120 can also include network, calculation, and/or other suitable types of components. In further embodiments, one or more of the components shown in FIG. 2 may be omitted to be implemented as a separate component. For example, in certain embodiments, the analysis component 124 can be omitted from the impact engine 120 and instead be implemented as a separate application. In other examples, the control component 126 can be implemented as a separate component of the alert management system 110 or as a standalone application.

The interface component 122 can be configured to facilitate accessing user profile 113 of users 101 (FIG. 1) in a datastore 112. In certain implementations, the user profile 113 can include user data aggregated from an organization chart, user directory, network administration information, and/or other suitable sources. Various types of user data may be used to derive an impact score. For example, an impact score can be generated based on one or more of the following:

- types of data a user handles or has access to (e.g., confidential or public data);
- organization position of the user (e.g., software engineer, engineering manager, vice president, or chief executive officer);
- membership of the user to one or more groups (e.g., executive committee, board of directors, or engineering management);
- network privileges of the user to on-premise, cloud, or other suitable types of networks (e.g., access to private cloud of an organization);
- privileges to secured database servers or other suitable types of servers; and
- access privileges to high value assets (e.g., design documents of new hardware/software products, source codes, or financial documents).

In other examples, an impact score can also be derived based on a number of other users reporting to the user, a security clearance of the user, and/or other suitable types of user data.

Upon accessing the user profile 113, the interface component 122 can be configured to provide the user profile 113 to the analysis component 124 to derive impact scores 117 for the users 101. In one example, values of the user data in the user profile 113 can be pre-processed to have corresponding numerical values prior to performing statistical analysis. For instance, a position of "software engineer" can be assigned a position value of ten while a position of "chief executive officer" is assigned a position value of one hundred. A first network privilege can be assigned a privilege value of one while a second network privilege higher than the first network privilege can be assigned a privilege value of ten, fifty, or one hundred. As such, various types of user data can be converted into corresponding sets of numerical values for statistical analysis. In certain implementations, a security analyst 103 can assign the various numerical values to the user data by providing a user input 115. In other implementations, the assigned numerical values may be from machine learning or other suitable sources.

For a certain type of the user data, the analysis component 124 can be configured to perform a statistical analysis to determine a statistical distribution of such user data. For instance, position values of multiple users 101 in an organization can be summed and averaged to derive a position mean in the organization. In other examples, position values can also be used to derive a medium, a standard deviation, or other suitable statistical parameters.

Subsequently, the analysis component 124 can be configured to calculate or assign an impact score 117 for each of the users 101 based on a deviation of the corresponding value of the user data to the derived mean (or other suitable statistical parameters) in the organization. In certain implementations, the deviation can be a linear difference. For example, if the position mean in the organization is eleven and a first user has a position value of ten (e.g., corresponding to a "software engineer"), the first user 101 can be assigned an importance score of one. If a second user 101 has a position value of one hundred (e.g., corresponding to a "chief executive officer"), the second user 101 can be assigned an importance score of eighty-nine. In other implementations, the deviation can be a non-linear difference between values of the user data and the derived mean. Example non-linear functions suitable for calculating the impact scores include logarithmic, exponential, and other suitable non-linear functions.

The various calculated or assigned impact scores 117 for the individual types of the user data can then be summed to derive an overall impact score for a user 101. In certain embodiments, the impact score 117 and/or the overall impact score 117 can be normalized, for instance, based on a scale of zero to one hundred. In other embodiments, the impact scores 117 from corresponding types of user data may be weighted differently in the overall impact score 117, for instance, by assigning different weight factors to each type of the user data. In yet further embodiments, the security analyst 103 or other suitable entities can manually modify the derived impact scores 117 and/or overall impact scores 117 of the users 101 based on security system knowledge or other suitable information. Upon determining the impact scores 117, the analysis component 124 can be configured to instruct the interface component 122 to store the generated impact scores as database records in the datastore 112.

In one embodiment, the analysis component 124 can be configured to calculate and recalculate impact scores 117 of users 101 daily, weekly, monthly, or based on other suitable time intervals using current information of the user profile 113. In another embodiment, the analysis component 124 can be configured to calculate or recalculate the impact score 117 of the user 101 on an ad hoc basis, i.e., in response to receiving the incoming alert 109. In further embodiments, the analysis component 124 can be configured to determine the impact score 117 in other suitable manners.

During operation, upon detecting an incoming alert 109 by the interface component 122, the control component 126 can be configured to determine a user 101 associated with the incoming alert 109. For example, the control component 126 may determine that the incoming alert 109 is alert associated with a user 101 for unauthorized access. The control component 126 can then be configured to determine an impact score 117 associated with the user 101. In certain embodiments, determination of the impact score 117 can include instructing the interface component 122 to retrieve a database record containing the impact score 117 previously calculated for the user 101 by the analysis component 124. In another embodiment, the control component 126 can be configured to instruct the analysis component 124 to recalculate the impact score 117 of the user 101 based on current information in the user profile 113.

In certain embodiments, upon determining the impact score 117 for the user 101, the control component 126 can be configured to rank the incoming alert 109 in relation to other alerts (not shown) based on the impact scores 117. For example, alerts 109 with higher impact scores can be ranked higher than other alerts 109 with lower impact scores. In other embodiments, the control component 126 can also be configured to automatically perform or cause to be performed, one or more security operations based on the impact score 117. For example, when the determined impact score 117 exceeds a preset impact threshold, the control component 126 can be configured to perform one or more of the following:

temporarily suspending access of the user 101;
   requesting addition security credentials (e.g., two-factor authentication) from the user 101;
   revoking security token of the user 101;
   disabling an account of the user 101 to the computer system 100; or
   sending an email or other suitable types of message to a manager or supervisor of the user 101 for confirmation or other additional information.

In other examples, the control component 126 can also be configured to place a lock on data items, block incoming/outgoing network traffic, or perform other suitable computing operations.

Several embodiments of the disclosed technology can thus efficiently address alerts 109 from various security controls 107 (FIG. 1) based on impact potential to the computer system 100 and/or the organization by a corresponding user 101. By determining impact scores 117 based on user profile 113 for incoming alerts 109, the alert management system 110 can prioritize and surface alerts 109 with high impact potentials to the security analyst 103, thereby allowing the security analyst 103 to efficiently process the incoming alerts 109. The alert management system 110 can also be configured to perform automated security actions in response to incoming alerts 109. As such, potential impact to the computer system 100 and/or the organization caused by a compromised user 101 associated with the incoming alert 109 can be reduced, thereby improving computer security in the computer system 100.

Figure 3:
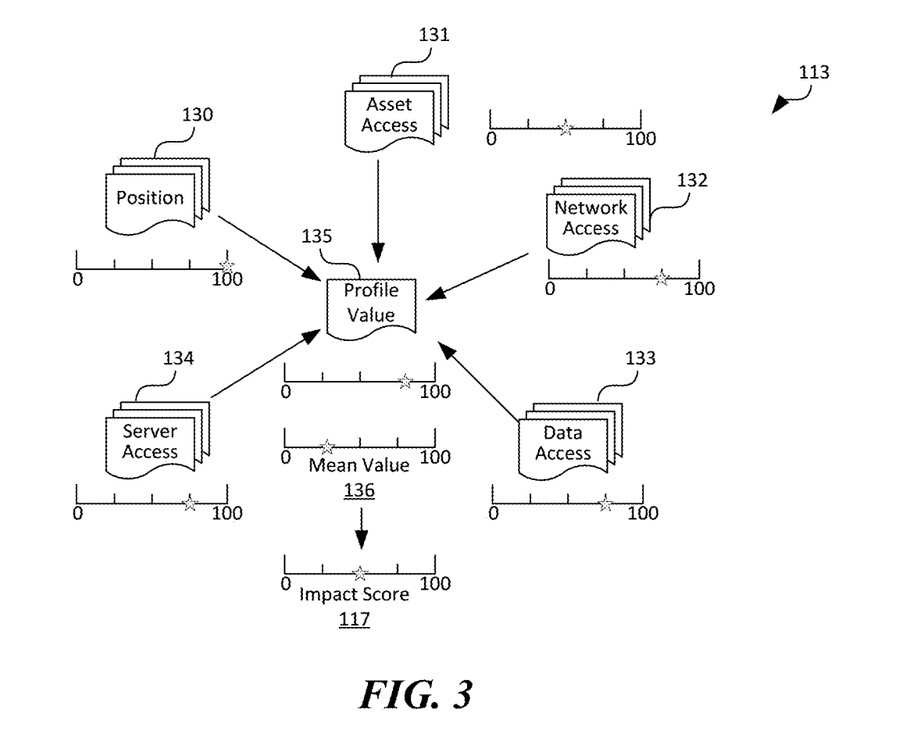
FIG. 3 is a schematic diagram illustrating an example scheme suitable for deriving an impact score based on a user profile in accordance with embodiments of the disclosed technology.

FIG. 3 is a schematic diagram illustrating an example scheme suitable for deriving an impact score 117 in FIG. 2 based on a user profile 113 in accordance with embodiments of the disclosed technology. In FIG. 3, example types of user data from the user profile 113 are used for illustration purposes. In other embodiments, additional and/or different types of user data can also be used for deriving an impact score 117.

As shown in FIG. 3, example types of user data from the user profile 113 include position in an organization 130, asset access privilege 131, network access privilege 132, data access privilege 133, and server access privilege 134. In accordance with embodiments of the disclosed technology, the analysis component 124 (FIG. 2) can be configured to assign a numerical value to each of the types of user data in the user profile 113. For instance, n the illustrated embodiment, based on the user data in the user profile 113, a value of one hundred can be assigned to the position of the user 101; a value of fifty can be assigned to the asset access privilege 131; a value of seventy five can be assigned to each of the network access privilege 132, the data access privilege 133, and the server access privilege 134. The analysis component 124 can then derive a profile value 135 corresponding to the user profile 113 by combining the various assigned numerical values for the position 130, asset access privilege 131, network access privilege 132, data access privilege 133, and server access privilege 134. In the illustrated embodiment, the combined numerical values are also normalized to a scale of zero to one hundred as the profile value 135. In other embodiments, the profile value 135 can be a total of the combined numerical values without scaling or scaled according to other suitable ranges.

Upon obtaining the profile value 135 for all or at least some users 101 in the organization, the analysis component 124 can be configured to perform a statistical analysis on the profile values 135 in the organization to derive, for instance, a mean value 136. In the illustrated example, the mean value is about twenty-five. The analysis component 124 can then be configured to derive an impact score 117 for the user profile 113 based on a deviation of the profile value 135 of the user 101 and the mean value 136 in the organization. For example, as shown in FIG. 3, a difference between the profile value is equal to seventy-five subtracted by twenty-five. As such, the impact score 117 can be set at fifty. In other examples, the impact score 117 can be set based on the deviation in other suitable manners.

FIGS. 4A-4D are flowcharts illustrating certain processes of impact potential based security alert management in accordance with embodiments of the disclosed technology. Though the processes are described below in the context of the computer system 100 in FIG. 1, in other embodiments, the processes can be implemented in other computer systems with additional and/or different components.

Figure 4A:
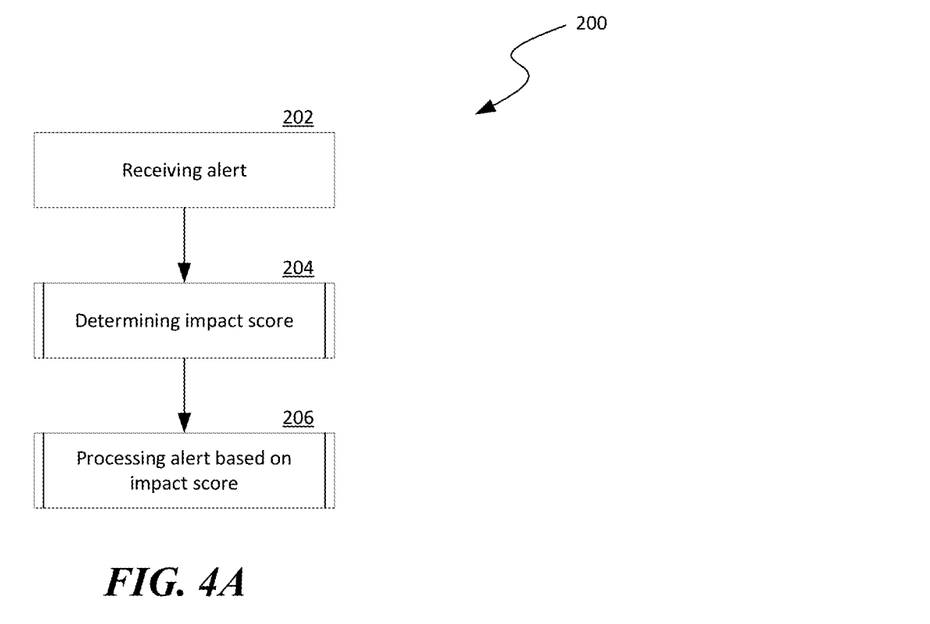
FIGS. 4A-4D are flowcharts illustrating certain processes of impact potential based security alert management in accordance with embodiments of the disclosed technology.

As shown in FIG. 4A, a process 200 can include receiving an alert at stage 202. The alert can be generated by a security control 107 (FIG. 1), as described in more detail above with reference to FIG. 1. The process 200 can then include determining an impact score corresponding to the incoming alert at stage 204. The impact score represents a level of potential damage a user associated with the alert can cause the computer system and/or an organization associated with the computer system. Example operations of determining the impact score are described below with reference to FIG. 4B. The process 200 can then include processing the received alert based on the determined impact score at stage 206. Example operations of determining the impact score are described below with reference to FIGS. 4C and 4D.

Figure 4B:
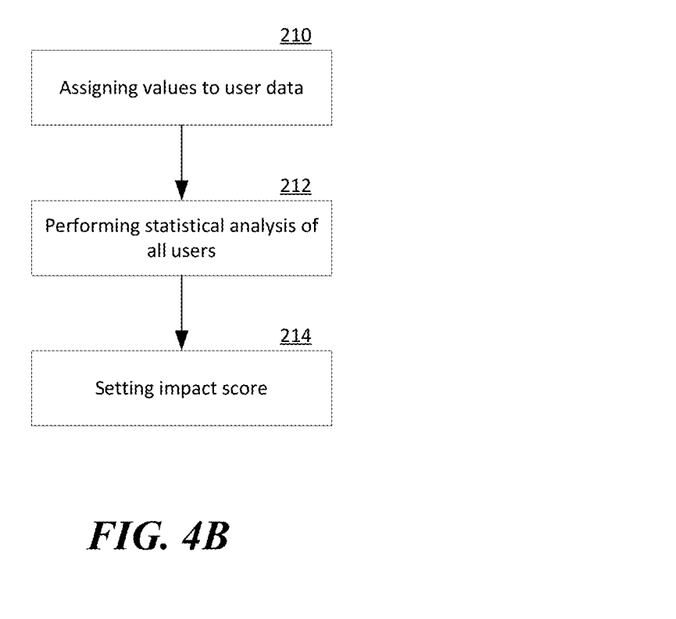

As shown in FIG. 4B, example operations for determining an impact score can include assigning numerical values to types of user data in a user profile at stage 210, as described above with reference to FIG. 3. The operations can then include performing a statistical analysis of assigned numerical values of all users at stage 212. The operations can further include setting an impact score based on a deviation between the assigned values of the user and corresponding mean values in the organization at stage 214.

Figure 4C:
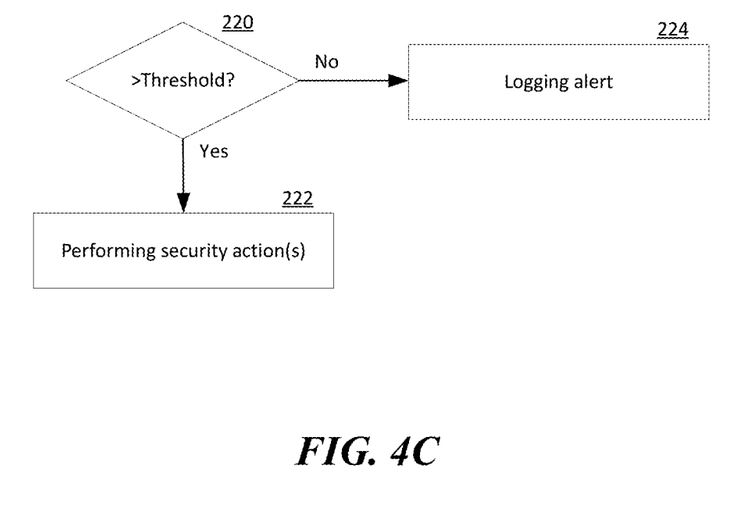

As shown in FIG. 4C, example operations of processing an incoming alert based on an impact score can include a decision stage 220 to determine whether the impact score exceeds a preset security threshold. In response to determining that the impact score exceeds the preset security threshold, the operations can include performing one or more security actions in the computer system at stage 222. Example security actions are described above with reference to FIG. 2. In response to determining that the impact score does not exceed the preset security threshold, the operations can include logging the incoming alert at stage 224 and/or perform other suitable operations.

Figure 4D:
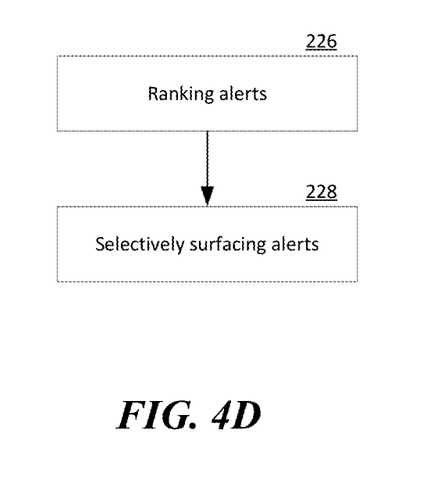

As shown in FIG. 4D, additional example operations of processing an incoming alert based on an impact score can include ranking the incoming alert in relation to other alerts based on corresponding impact scores at stage 226. The operations can then include selectively surfacing one or more alerts based on corresponding ranking values at stage 228. For instance, top five, ten, twenty, fifty, or other suitable numbers of alerts from the ranked alerts may be surfaced to a security analyst.

Figure 5:
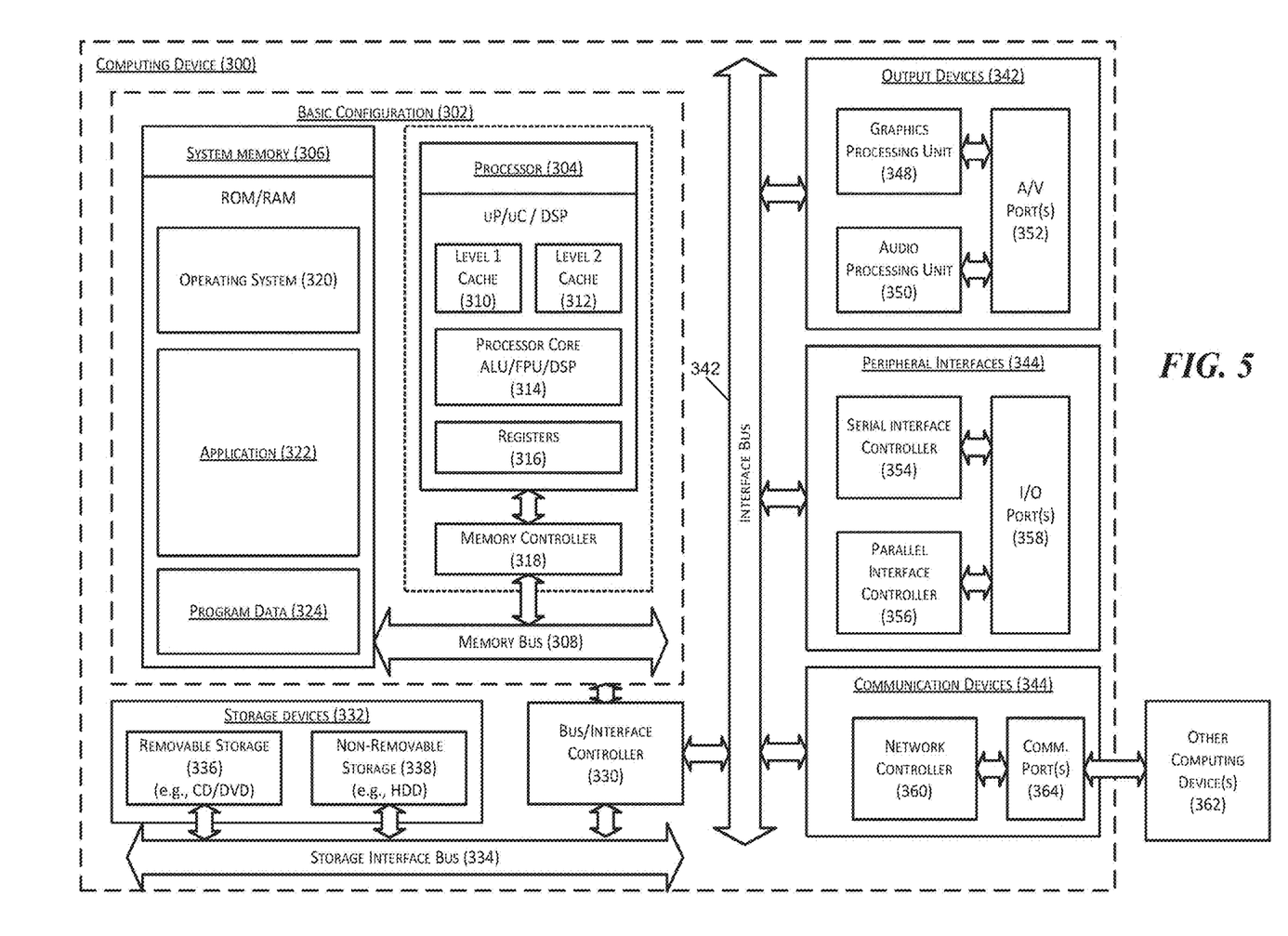
FIG. 5 is a computing device suitable for certain components of the computer system in FIG. 1.

FIG. 5 is a computing device 300 suitable for certain components of the computer system 100 in FIG. 1. For example, the computing device 300 can be suitable for the client devices 102, the nodes 106, or the alert management system of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of impact potential based alert management in a computer system associated with an organization, the method comprising:
   receiving, via the computer network, data representing an alert from a security control in the computer system, the alert indicating that a security rule has been violated by a user of the organization; and
   in response to receiving the data representing the alert, determining an impact score associated with the user who has violated the security rule, the impact score representing a level of potential damage the user can cause the organization based at least on a profile of the user in relation to other users in the organization, wherein the profile of the user comprises user data representing an organization position of the user, wherein determining the impact score comprises:
assigning a numerical value to the organization position of the user and additional numerical values to organization positions of other users in the organization,
calculating a mean value of a plurality of numerical values, which includes at least the additional numerical values that are assigned to the organization positions of the other users in the organization, and
setting the impact score based at least on a deviation of the numerical value of the user from the mean value, and
wherein the profile of the user indicating that the user has at least one of a high data access privilege, a high organizational position, or an authorization to access a high value asset corresponds to a high level of potential damage the user can cause the organization; and
based at least on the impact score of the user exceeding an impact threshold as a result of the profile of the user indicating that the user has at least one of the high data access privilege, the high organizational position, or the authorization to access the high value asset, executing, in the computer system, an automatic security action that limits access of the user to at least one of a hardware component or a software component of the computer system.

2. The method of claim 1, wherein determining the impact score associated with the user comprises calculating the impact score based at least on one or more of a type of data the user handles or has access to, an organization position of the user, a membership of the user to a group, a network privilege of the user to the computer network, or an access privilege to assets in the organization.

3. The method of claim 1, wherein:
the profile of the user further comprises second user data representing an access privilege to assets in the organization; and
determining the impact score associated with the user comprises:
assigning a second numerical value to the access privilege to assets of the user and additional second numerical values to access privileges to assets of other users in the organization;
calculating a second mean value of a plurality of second numerical values, which includes at least the additional second numerical values that are assigned to the access privileges to the assets of the other users in the organization; and
setting the impact score based at least on a deviation of the second numerical value of the user from the second mean value.

4. The method of claim 1, wherein:
the profile of the user comprises second user data representing two or more of a type of data the user handles or has access to, an organization position of the user, a membership of the user to a group, a network privilege of the user to the computer network, or an access privilege to assets in the organization; and
determining the impact score associated with the user comprises:
deriving a first user value and a second user value that correspond to the two or more of a type of data the user handles or has access to, an organization position of the user, a membership of the user to a group, a network privilege of the user to the computer network, or an access privilege to assets in the organization;
deriving an overall user value by combining the first user value and the second user value; and
setting the impact score based at least on a difference between the overall user value of the user and a mean user value, which is based at least on profiles of a plurality of users in the organization that comprises at least the other users.

5. The method of claim 1, wherein:
the profile of the user comprises second user data representing two or more of a type of data the user handles or has access to, an organization position of the user, a membership of the user to a group, a network privilege of the user to the computer network, or an access privilege to assets in the organization; and
determining the impact score associated with the user comprises:
deriving a first user value and a second user value that correspond to the two or more of a type of data the user handles or has access to, an organization position of the user, a membership of the user to a group, a network privilege of the user to the computer network, or an access privilege to assets in the organization;
deriving an overall user value by combining the first user value and the second user value with corresponding weight factors; and
setting the impact score based at least on a difference between the overall user value of the user and a mean user value, which is based at least on profiles of a plurality of users in the organization that comprises at least the other users.

6. The method of claim 1, further comprising:
calculating a ranking value of the alert in relation to other alerts based at least on the impact score; and
selectively surfacing the alert to a system analyst based at least on the calculated ranking value in relation to other alerts.

7. The method of claim 1, wherein executing the automatic security action comprises executing at least one of the following in the computer system:
temporarily suspending access of the user;
requesting addition security credentials from the user;
revoking security token of the user; or
disabling an account of the user to the computer system.

8. The method of claim 1, wherein:
the user is a first user;
the alert is a first alert;
the impact score is a first impact score; and
the method further comprises upon receiving data representing a second alert indicating that another security rule has been violated by a second user of the organization, establishing a second impact score associated with the second user, the second impact score being higher than the first impact score based at least in part on the second user having an organization position, a network privilege to the computer network, or a privilege to hardware or software components of the computer system higher than the first user.

9. A computing device configured for impact potential based alert management in a computer system associated with an organization, the computing device comprising:
a processor; and
a memory coupled to the processor, the memory having instructions executable by the processor to cause the computing device to:
upon receiving data representing an alert indicating that a security rule has been violated by a user of the organization,
determine an impact score associated with the user who has violated the security rule, the impact score representing a level of potential damage the user can cause the organization based at least on a profile of the user in relation to other users in the organization,
wherein the profile of the user comprises user data representing an access privilege to an asset in the organization,
wherein determine the impact score associated with the user comprises: assign a numerical value to the access privilege of the user to the asset and additional numerical values to access privileges of other users in the organization to the asset, calculate a mean value of a plurality of numerical values, which includes at least the additional numerical values that are assigned to the access privileges of the other users in the organization to the asset, and set the impact score based at least on a deviation of the numerical value of the user from the mean value, and
wherein the profile of the user indicating that the user has at least one of a high data access privilege, a high organizational position, or an authorization to access a high value asset corresponds to a high level of potential damage the user can cause the organization; and
based at least on the impact score of the user exceeding an impact threshold as a result of the profile of the user indicating that the user has at least one of the high data access privilege, the high organizational position, or the authorization to access the high value asset, issue an instruction to perform a security action in the computer system that limits access of the user to at least one of a hardware component or a software component of the computer system.

10. The computing device of claim 9, wherein the impact score associated with the user is calculated based at least on one or more of a type of data the user handles or has access to, an organization position of the user, a membership of the user to a group, a network privilege of the user to the computer network, or an access privilege to assets in the organization.

11. The computing device of claim 9, wherein:
the profile of the user further comprises second user data representing an organization position of the user; and
to determine the impact score associated with the user comprises to:
assign a second numerical value to the organization position of the user and additional second numerical values to organization positions of other users in the organization;
calculate a second mean value of a plurality of second numerical values, which includes at least the additional second numerical values that are assigned to the organization positions of the other users in the organization; and
set the impact score based at least on a deviation of the second numerical value of the user from the second mean value.

12. The computing device of claim 9, wherein:
the profile of the user comprises multiple types of user data; and
to determine the impact score associated with the user comprises to:
derive a first user value and a second user value that correspond to the multiple types of user data;
derive an overall user value by combining the first user value and the second user value; and
set the impact score based at least on a difference between the overall user value of the user and a mean user value, which is based at least on profiles of a plurality of users in the organization that comprises at least the other users.

13. The computing device of claim 9, wherein:
the profile of the user comprises multiple types of user data; and
to determine the impact score associated with the user comprises to:
derive a first user value and a second user value that correspond to the multiple types of user data;
derive an overall user value by combining the first user value and the second user value with corresponding weight factors; and
set the impact score based at least on a difference between the overall user value of the user and a mean user value, which is based at least on profiles of a plurality of users in the organization that comprises at least the other users.

14. The computing device of claim 9, wherein to issue the instruction comprises to issue an instruction to perform at least one of:
temporarily suspending access of the user;
requesting addition security credentials from the user;
revoking security token of the user;
sending a message to the user's manager or supervisor for confirmation; or
disabling an account of the user to the computer system.

15. The computing device of claim 9, wherein:
the user is a first user;
the alert is a first alert;
the impact score is a first impact score; and
the memory comprises additional instructions executable by the processor to cause the computing device to:
receive data representing a second alert indicating that another security rule has been violated by a second user of the organization; and
determine a second impact score associated with the second user, the second impact score being higher than the first impact score based at least in part on the second user having an organization position, a network privilege to the computer network, or a privilege to hardware or software components of the computer system higher than the first user.

16. A method of impact potential based alert management in a computer system associated with an organization, the method comprising:
receiving, via the computer network, data representing an alert from a security control in the computer system, the alert indicating that a security rule has been violated by a user of the organization, wherein the user has a profile in the organization; and in response to receiving the data representing the alert,
determining an impact score associated with the user based at least on the profile of the user,
wherein the profile of the user comprises user data representing an access privilege to an asset in the organization,
wherein determining the impact score associated with the user comprises:
assigning a numerical value to the access privilege of the user to the asset and additional numerical values to access privileges of other users in the organization to the asset,
calculating a mean value of a plurality of numerical values, which includes at least the additional numerical values that are assigned to the access privileges of the other users in the organization to the asset, and
setting the impact score based at least on a deviation of the numerical value of the user from the mean value;
upon determining the impact score of the user,
calculating a ranking value of the alert in relation to other alerts based at least on the impact score and other impact scores corresponding to the other alerts; and
selectively surfacing the alert to a system analyst based at least on whether the ranking value is comprised in a subset of ranking values that are calculated for the alerts such that the subset comprises a top fixed number of the ranking values, which are greater than the other ranking values; and
causing execution of a security action that limits access of the user to at least one of a hardware component or a software component of the computer system in response to determining that the impact score exceeds an impact threshold.

17. The method of claim 16, wherein the profile of the user comprises data indicating a type of data the user handles or has access to, an organization position of the user, a membership of the user to a group, a network privilege of the user to the computer network, or an access privilege to assets in the organization.

18. The method of claim 16, further comprising executing at least one of the following in the computer system in response to determining that the impact score exceeds an impact threshold:
temporarily suspending access of the user;
requesting addition security credentials from the user;
revoking security token of the user; or disabling an account of the user to the computer system.

19. The method of claim 1, wherein the profile of the user indicating that the user has the high organizational position corresponds to the high level of potential damage the user can cause the organization; and
wherein executing the automatic security action comprises:
based at least on the impact score of the user exceeding the impact threshold as the result of the profile of the user indicating that the user has the high organizational position, executing, in the computer system, the automatic security action, which limits the access of the user to at least one of the hardware component or the software component of the computer system.

20. The method of claim 16, wherein the profile of the user further comprises second user data representing an organization position of the user; and
wherein determining the impact score associated with the user comprises:
assigning a second numerical value to the organization position of the user and additional second numerical values to organization positions of other users in the organization;
calculating a second mean value of a plurality of second numerical values, which includes at least the additional second numerical values of the other users in the organization; and
setting the impact score based at least on a deviation of the second numerical value of the user from the second mean value.

* * * * *